(12) United States Patent
Lin et al.

(10) Patent No.: US 7,596,301 B2
(45) Date of Patent: Sep. 29, 2009

(54) REVERSE TRICK MODE USING INTRA PICTURES

(75) Inventors: Shu Lin, Indianapolis, IN (US); Donald Henry Willis, Indianapolis, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 881 days.

(21) Appl. No.: 10/493,288

(22) PCT Filed: Oct. 22, 2002

(86) PCT No.: PCT/US02/33821

§ 371 (c)(1),
(2), (4) Date: Apr. 22, 2004

(87) PCT Pub. No.: WO03/036956

PCT Pub. Date: May 1, 2003

(65) Prior Publication Data

US 2004/0252969 A1    Dec. 16, 2004

Related U.S. Application Data

(60) Provisional application No. 60/334,914, filed on Oct. 23, 2001.

(51) Int. Cl.
    *H04N 5/91* (2006.01)
(52) U.S. Cl. .............................. 386/69; 386/46; 386/68; 386/111
(58) Field of Classification Search ................... 386/46, 386/52, 68–70, 81–82, 109, 111, 112, 124–126; 348/439, 441, 526, 911
See application file for complete search history.

(56) References Cited

U.S. PATENT DOCUMENTS

| 5,461,420 | A | * | 10/1995 | Yonemitsu et al. ...... 375/240.15 |
| 5,684,539 | A | | 11/1997 | Boyce et al. ................. 348/420 |
| 5,805,762 | A | | 9/1998 | Boyce et al. ................... 386/68 |
| 5,943,445 | A | | 8/1999 | Dufaux |
| 5,978,542 | A | | 11/1999 | Ting et al. ...................... 386/68 |
| 5,978,855 | A | | 11/1999 | Metz et al. ................... 709/249 |
| 6,009,236 | A | * | 12/1999 | Mishima et al. ............. 386/111 |

(Continued)

FOREIGN PATENT DOCUMENTS

JP    10-285602    10/1998

(Continued)

*Primary Examiner*—Thai Tran
*Assistant Examiner*—Mishawn Dunn
(74) *Attorney, Agent, or Firm*—Robert D. Shedd; Robert B. Levy; Jorge Tony Villabon

(57) ABSTRACT

The invention concerns a method and system for performing a trick mode in response to a trick mode command. The method 200 can include the steps of modifying a field display order indicator of at least one intra picture having at least a first field and a second field in a video signal containing intra pictures to enable the second field of the at least one intra picture to be displayed before the first field of the at least one intra picture and decoding the at least one modified intra picture. In one arrangement, the decoding step can be performed with a remote decoder, and the video signal can include non-intra pictures.

18 Claims, 3 Drawing Sheets

U.S. PATENT DOCUMENTS

| | | | |
|---|---|---|---|
| 6,058,241 A | 5/2000 | Kawamura et al. | 386/68 |
| 6,118,491 A * | 9/2000 | Wu et al. | 348/526 |
| 6,192,186 B1 | 2/2001 | Murashima et al. | 386/68 |
| 6,201,927 B1 | 3/2001 | Comer | 386/68 |
| 6,356,702 B1 * | 3/2002 | Suzuki | 386/68 |
| 6,466,624 B1 * | 10/2002 | Fogg | 375/240.27 |
| 7,205,332 B2 | 4/2007 | Jung | |
| 2002/0191959 A1 | 12/2002 | Lin et al. | 386/68 |

FOREIGN PATENT DOCUMENTS

| | | |
|---|---|---|
| JP | 2001-285796 | 10/2001 |
| KR | 20040067421 | 7/2004 |
| WO | 96/13121 | 5/1996 |
| WO | 99/65239 | 12/1999 |
| WO | WO 00/59218 | 10/2000 |

* cited by examiner

REVERSE TRICK MODE USING INTRA PICTURES

This application claims the benefit under 35 U.S.C. § 365 of International Application PCT/US02/33821, filed Oct. 22, 2002, which claims the benefit of United States Provisional Application No. 60/334,914, filed Oct. 23, 2001.

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder or player's MPEG decoder before being displayed on the conventional television. Significantly, however, many DTVs contain their own MPEG decoders. As such, if a digital video recorder or player is connected to a DTV, the video signal read from the disc is remotely decoded by the DTVs decoder, which is typically not under the control of the digital video recorder's or player's microprocessor. This configuration can be referred to as a remote decoder arrangement.

There is, however, an important disadvantage in decoding digitally encoded signals with a remote DTV decoder. Namely, it is very difficult to perform trick modes in this type of arrangement. A trick mode can be any playback of video in which the playback is not done at normal speed or in a reverse direction. In particular, it is virtually impossible to perform a reverse trick mode in a remote decoder arrangement because the remote decoder cannot be instructed to arrange the decoded pictures for display in reverse order. Thus, it is desirable to provide a way to perform a reverse trick mode in a remote decoder arrangement without increasing system costs or complexity.

SUMMARY OF THE INVENTION

The present invention concerns a method of performing a trick mode, comprising the steps of, in response to a trick mode command, modifying a field display order indicator of at least one intra picture having at least a first field and a second field in a video signal containing intra pictures and non-intra pictures to enable the second field of the at least one intra picture to be displayed before the first field of the at least one intra picture and decoding the at least one intra picture. In one arrangement, the decoding step can be performed with a remote decoder, and the video signal includes non-intra pictures. These non-intra pictures can include bidirectional predictive or predictive pictures.

In one aspect, the field display order indicator can be a top_field_first flag. In addition, the first field can be a top field, and the second field can be a bottom field. The modifying step can include the step of inverting the top_field_first flag from a value of "1" to a value of "0" such that the bottom field is displayed before the top field. Alternatively, the first field can be a bottom field and the second field can be a top field. In this arrangement, the modifying step can include the step of inverting the top_field_first flag from a value of "0" to a value of "1" such that the top field is displayed before the bottom field. In another aspect, the trick mode command can be a reverse trick mode command.

The present invention also concerns a system for performing a trick mode. The system includes a controller for reading data from a storage medium and outputting a video signal containing intra pictures and non-intra pictures, in which the intra pictures contain at least a first field and a second field and a processor that is programmed to, in response to a trick mode command, modify a field display order indicator of at least one of the intra pictures in the video signal to enable the second field of the at least one intra picture to be displayed before the first field of the at least one intra picture. The system also includes a decoder for decoding the at least one intra picture. The system also includes suitable software and circuitry to implement the methods as described above.

DETAILED DESCRIPTION OF THE PREFERRED EMBODIMENTS

Figure 1:
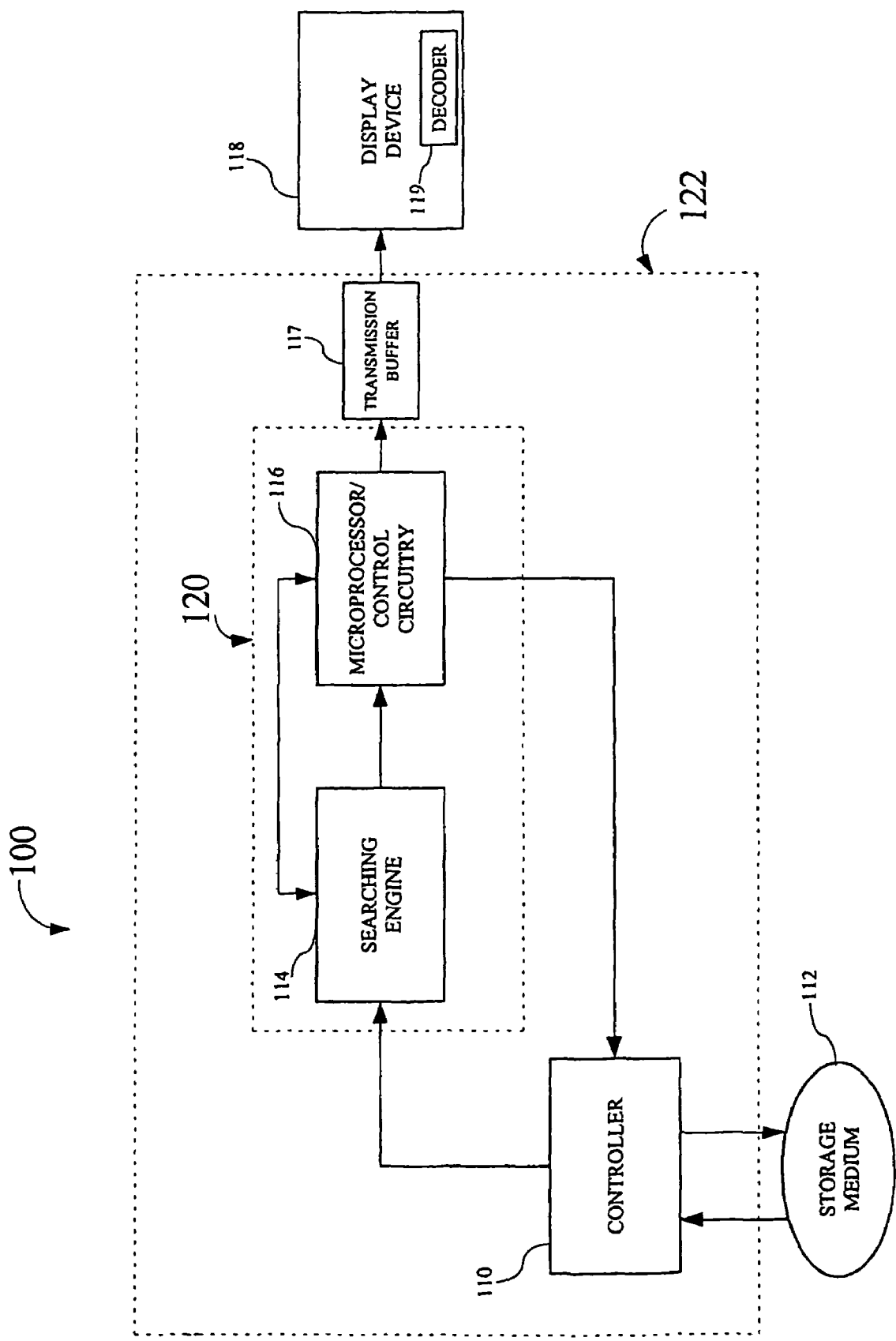
FIG. 1 is a block diagram of a system that can perform a reverse trick mode using intra pictures in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a searching engine 114, a microprocessor 116, a transmission buffer 117 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive arrangements.

It should be understood that all or portions of the searching engine 114 and the microprocessor 116 can be a processor 120 within contemplation of the present invention. Further, all or portions of the controller 110, the searching engine 114, the microprocessor 116 and the transmission buffer 117 can be a bitstream source 122 within contemplation of the present invention. In one arrangement, the display device 118 can contain its own decoder 119 for decoding all or a portion of any video signal read from the storage medium 112 and processed by the bitstream source 122. In this particular arrangement, a decoder (not shown) in the bitstream source 122 typically does not decode the video signal read from the storage medium 112. This particular embodiment can be referred to as a remote decoder arrangement. It should be noted, however, that the invention is not limited to this arrangement, as the invention can be practiced in other suitable systems.

In operation, the controller 110 can read a video signal from the storage medium 112. In one arrangement, this video signal can be a non-progressive video signal containing one or more intra (I) pictures having at least a first field and a second field. If the microprocessor 116 receives a trick mode command such as a reverse trick mode command, the microprocessor 116 can signal the searching engine 114 to locate one or more suitable pictures in the video signal for further processing. In one embodiment and without limitation, these suitable pictures can be I pictures.

Once a suitable picture is located, the searching engine 114 can signal the microprocessor 116, and the microprocessor 116 can modify a certain portion of data contained within the picture. The microprocessor 116 can transmit the modified picture to the decoder 119, which can decode the picture for display on the display device 118. The modification of the picture's data can create a reverse display on the display device 118. The overall operation of the invention will be discussed in greater detail below.

Reverse Trick Modes Using Intra Pictures

Figure 2:
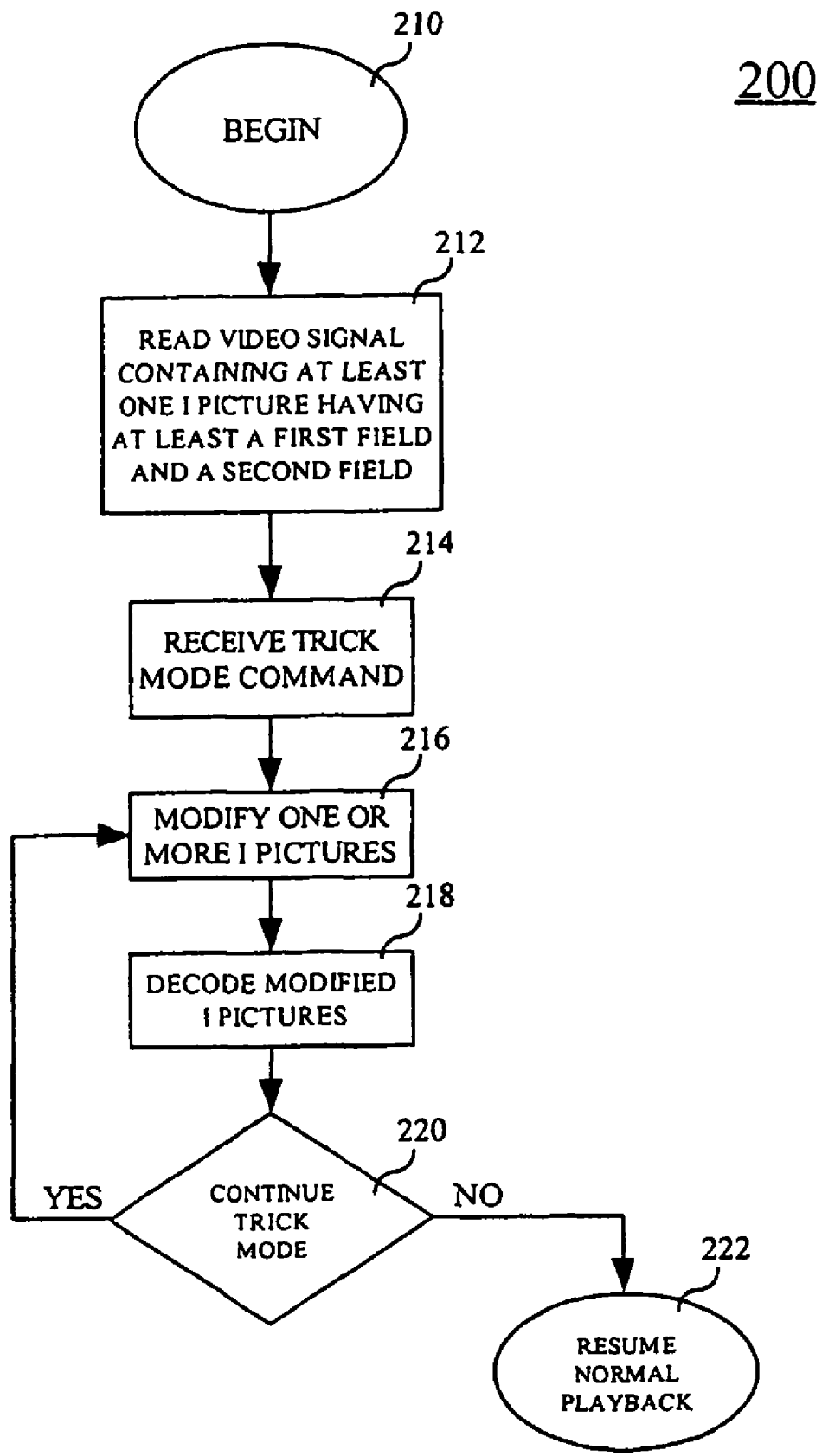
FIG. 2 is a flow chart that illustrates an operation of performing a reverse trick mode using intra pictures in accordance with the inventive arrangements.

Referring to FIG. 2, a method 200 is illustrated, which demonstrates one way to perform a trick mode, such as a reverse trick mode, using intra pictures. In one arrangement, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder.

As an example, the bitstream source can be an optical storage medium player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 210, the process can begin. At step 212, a video signal containing at least one I picture having at least a first field and a second field can be read. The video signal can also contain non-intra (non-I) pictures such as bidirectional predictive (B) pictures or predictive (P) pictures. A first field can be the field of an I picture that is normally displayed first during normal playback of that particular picture. Additionally, a second field can be the field of an I picture that is normally displayed after the display of the first field of the I picture. As an example, the first field can be a top field, and the second field can be a bottom field. The invention is not so limited, however, as the first field can also be a bottom field, and the second field can be a top field.

At step 214, a trick mode command can be received. In one arrangement, the trick mode command can be a reverse trick mode command. For purposes of the invention, a reverse trick mode command can be any command in which one or more of the pictures in the video signal are to be displayed in reverse order. As shown in step 216, one or more of the I pictures can be modified to enable the second field of the I picture to be displayed before the first field of the I picture. Switching the display order of the at least first and second fields of the I pictures can create a reverse display on a display device. At step 218, the modified I pictures can be decoded for display.

Figure 3:
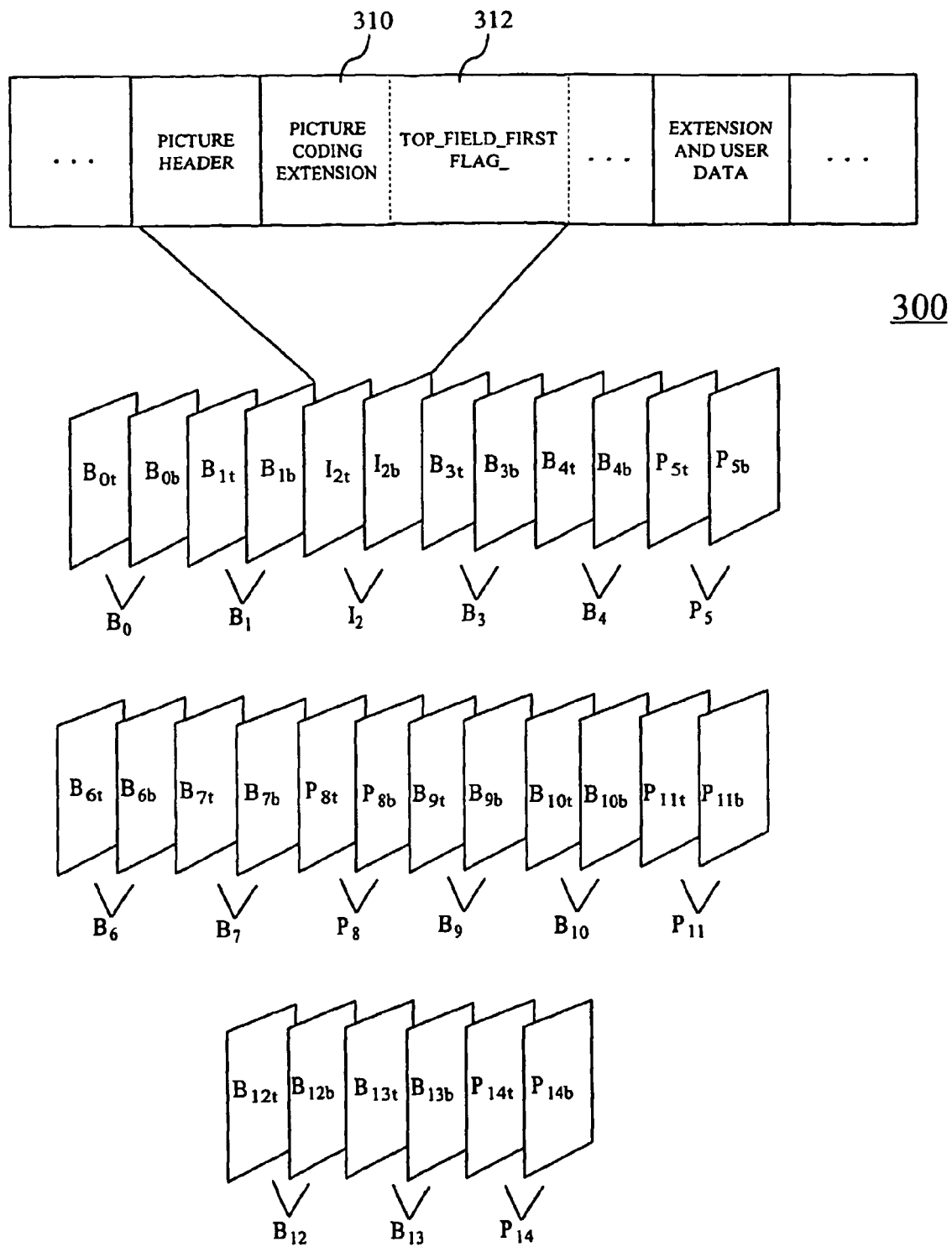
FIG. 3 illustrates a typical group of pictures structure in an MPEG video signal containing non-progressive pictures and a portion of the MPEG syntax for one of the non-progressive pictures.

Referring to FIG. 3, a typical group of pictures (GOP) 300 containing non-progressive pictures in display order is shown. The subscript numbers indicate when each picture will be displayed—relative to the other pictures in the GOP—at a normal playback speed. The lowercase letter "t" can represent a top field, and the lowercase letter "b" can represent a bottom field. This GOP 300 can be one of many GOPs in a video signal. Although the invention is not limited to this particular GOP structure, the GOP 300 will serve to illustrate how a reverse trick mode can be performed in accordance with steps 216 and 218 of method 200.

In this example, picture $I_2$ can have a top field, $I_{2t}$, as a first field and a bottom field, $I_{2b}$, as a second field. In this particular GOP 300, during normal playback and when picture $I_2$ is ready to be displayed, the top field, $I_{2t}$, is displayed first and the bottom field, $I_{2b}$, is displayed next. Once the reverse trick mode command is received, picture $I_2$ can be modified in accordance with the inventive arrangements.

Picture $I_2$ can contain a field display order indicator, which can be used to instruct a decoder as to which order the fields of the picture $I_2$ are to be displayed. A portion of the syntax that comprises the data structure of picture $I_2$ is shown in FIG. 3. Picture $I_2$ can include a picture coding extension header 310, and the field display order indicator can be contained within this header 310. In one arrangement, the field display order indicator can be a top_field_first flag 312. During normal playback, the top_field_first flag 312 of picture $I_2$ is typically set to a value of "1" to indicate that the first field, in this case the top field $I_{2t}$, is to be displayed before the second field, or the bottom field $I_{2b}$.

Following the initiation of the reverse trick mode, however, the value of the top_field_first flag can be inverted from a value of "1" to a value of "0." This inversion can cause the second field, in this example bottom field $I_{2b}$, to be displayed before the first field, or top field $I_{2t}$. Once the top_field_first flag has been modified, picture $I_2$ can be decoded, and the fields, $I_{2t}$ and $I_{2b}$, can be displayed accordingly. This process can continue with any number of preceding I pictures in any number of GOPs such that the second field of these I pictures is displayed before the first field during the reverse trick mode command.

It is understood that the discussion relating to FIG. 3 is merely an example, as the invention can be practiced with any other suitable GOPs and any other suitable number of I pictures. Moreover, the I pictures are not limited to having only first and second fields, and the I pictures are not limited to this particular modification. As an example, for normal display, the top_field_first flag can have a value of "0" to reflect that the bottom field is to be displayed before the top field. During a reverse trick mode command, however, the top_field_first flag can be inverted from the "0" value to a value of "1" to indicate that the top field, which in this case is the second field, is to be displayed before the bottom field—the first field in this scenario.

Referring back to method 200, it can be determined whether the trick mode is to continue, as shown at decision block 220. If yes, the method 200 can resume at step 216. If not, then normal playback can resume at step 222. It is understood that the method 200 is not limited in this regard, as the decision block 220 can be positioned at any other suitable location in the method 200.

Although the present invention has been described in conjunction with the embodiments disclosed herein, it should be understood that the foregoing description is intended to illustrate and not limit the scope of the invention as defined by the claims.

The invention claimed is:

1. A method of performing a trick mode, comprising the steps of:
   in response to a trick mode command, modifying a field display order indicator of at least one intra picture having at least a first field and a second field in a video signal containing intra pictures to enable the second field of the at least one intra picture to be displayed before the first field of the at least one intra picture; and decoding the at least one modified intra picture.

2. The method according to claim 1, wherein said decoding step is performed with a remote decoder.

3. The method according to claim 1, wherein the video signal includes non-intra pictures.

4. The method according to claim 3, wherein the non-intra pictures include bidirectional predictive pictures.

5. The method according to claim 3, wherein the non-intra pictures include predictive pictures.

6. The method according to claim 1, wherein the field display order indicator comprises a top_field_first flag.

7. The method according to claim 6, wherein the first field comprises a top field and the second field comprises a bottom field, wherein said modifying step comprises the step of inverting the top_field_first flag from a value of "1" to a value of "0" such that the bottom field is displayed before the top field.

8. The method according to claim 6, wherein the first field comprises a bottom field and the second field comprises a top field, wherein said modifying step comprises the step of inverting the top_field_first flag from a value of "0" to a value of "1" such that the top field is displayed before the bottom field.

9. The method according to claim 1, wherein the trick mode command comprises a reverse trick mode command.

10. A system for performing a trick mode, comprising:
    a controller for reading data from a storage medium and outputting a video signal containing intra pictures, wherein the intra pictures contain at least a first field and a second field;
    a processor, wherein the processor is programmed to, in response to a trick mode command, modify a field display order indicator of at least one of the intra pictures in the video signal to enable the second field of the at least one intra picture to be displayed before the first field of the at least one intra picture; and
    a decoder for decoding the at least one modified intra picture.

11. The system according to claim 10, wherein the decoder comprises a remote decoder, whereby the decoder is not under the direct control of the processor.

12. The system according to claim 10, wherein the video signal includes non-intra pictures.

13. The system according to claim 12, wherein the non-intra pictures include bidirectional predictive pictures.

14. The system according to claim 12, wherein the non-intra pictures include predictive pictures.

15. The system according to claim 11, wherein the field display order indicator comprises a top_field_first flag.

16. The system according to claim 15, wherein the first field comprises a top field and the second field comprises a bottom field, wherein the processor is further programmed to perform the modifying step by inverting the top_field_first flag from a value of "1" to a value of "0" such that the bottom field is displayed before the top field.

17. The system according to claim 15, wherein the first field comprises a bottom field and the second field comprises a top field, wherein the processor is further programmed to perform the modifying step by inverting the top_field_first flag from a value of "0" to a value of "1" such that the top field is displayed before the bottom field.

18. The system according to claim 10, wherein the trick mode command comprises a reverse trick mode command.

* * * * *

UNITED STATES PATENT AND TRADEMARK OFFICE
CERTIFICATE OF CORRECTION

PATENT NO.       : 7,596,301 B2                                Page 1 of 1
APPLICATION NO. : 10/493288
DATED            : September 29, 2009
INVENTOR(S)      : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Signed and Sealed this

Twenty-eighth Day of September, 2010

David J. Kappos
*Director of the United States Patent and Trademark Office*